(12) United States Patent
Schulte Moenting

(10) Patent No.: US 11,081,707 B2
(45) Date of Patent: Aug. 3, 2021

(54) FUEL CELL

(71) Applicant: Robert Bosch GmbH, Stuttgart (DE)

(72) Inventor: Martin Schulte Moenting, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 16/468,382

(22) PCT Filed: Nov. 30, 2017

(86) PCT No.: PCT/EP2017/080965
§ 371 (c)(1),
(2) Date: Jun. 11, 2019

(87) PCT Pub. No.: WO2018/108547
PCT Pub. Date: Jun. 21, 2018

(65) Prior Publication Data
US 2019/0334181 A1 Oct. 31, 2019

(30) Foreign Application Priority Data
Dec. 12, 2016 (DE) .................. 10 2016 224 676.3

(51) Int. Cl.
*H01M 8/0258* (2016.01)
*H01M 8/2483* (2016.01)
*H01M 8/04089* (2016.01)

(52) U.S. Cl.
CPC ..... *H01M 8/0258* (2013.01); *H01M 8/04089* (2013.01); *H01M 8/2483* (2016.02); *H01M 2250/20* (2013.01)

(58) Field of Classification Search
None
See application file for complete search history.

(56) References Cited

U.S. PATENT DOCUMENTS

2015/0072265 A1* 3/2015 Ishida ................. H01M 8/0271
429/483

FOREIGN PATENT DOCUMENTS

DE 112013001654 12/2014
DE 112007001059 5/2015
(Continued)

OTHER PUBLICATIONS

International Search Report for Application No. PCT/EP2017/080965 dated Feb. 7, 2018 (English Translation, 2 pages).

*Primary Examiner* — Wyatt P McConnell
(74) *Attorney, Agent, or Firm* — Michael Best & Friedrich LLP

(57) ABSTRACT

The invention relates to a fuel cell (2), comprising at least one membrane-electrode unit (10) having a first electrode (21) and a second electrode (22), which are separated from each other by a membrane (18), and at least two bipolar plates (40), which connect the membrane-electrode unit (10) on both sides, wherein the bipolar plates (40) are penetrated by a first supply channel, for supplying a fuel, and by a second supply channel, for supplying an oxidation means, wherein a first distribution structure (50) facing the first electrode (21) connects to a first edge of the first supply channel, and a second distribution structure (60) facing the second electrode (22) connects to a second edge of the second supply channel. The first electrode (21) extends along the membrane (18) in a region which is spaced apart from the first edge of the first supply channel, and the second electrode (22) extends along the membrane (18) in a region which is spaced apart from the second edge of the second supply channel.

10 Claims, 3 Drawing Sheets

(56) References Cited

FOREIGN PATENT DOCUMENTS

| | | |
|---|---|---|
| DE | 102013226815 | 6/2015 |
| JP | 2000323159 A | 11/2000 |
| JP | 2007324108 A | 12/2007 |
| JP | 2009037854 A | 2/2009 |

\* cited by examiner

FUEL CELL

BACKGROUND OF THE INVENTION

The invention relates to a fuel cell comprising at least one membrane electrode unit having a first electrode and a second electrode that are separated from one another by a membrane, and at least two bipolar plates that adjoin the membrane electrode unit on either side. These bipolar plates are interrupted by a first feed conduit for supply of a fuel and by a second feed conduit for supply of an oxidant.

A fuel cell is a galvanic cell that converts the chemical energy of reaction from a continuously supplied fuel and an oxidant to electrical energy. A fuel cell is thus an electrochemical energy transducer. In known fuel cells, in particular, hydrogen (H2) and oxygen (O2) are converted to water (H2O), electrical energy and heat. Also known, however, are fuel cells that work with methanol or methane.

The known fuel cells include proton exchange membrane (PEM) fuel cells. Proton exchange membrane fuel cells have a membrane disposed in the center that is permeable to protons, i.e. to hydrogen ions. The oxidant, especially atmospheric oxygen, is thus spatially separated from the fuel, especially hydrogen.

Proton exchange membrane fuel cells also have an anode and a cathode. The fuel is supplied to the anode of the fuel cell and oxidized catalytically to protons with release of electrons. The protons pass through the membrane to the cathode. The electrons released are led off from the fuel cell and flow via an external circuit to the cathode.

The oxidant is supplied to the cathode of the fuel cell and it reacts by accepting the electrons from the external circuit and protons that pass through the membrane to the cathode to give water. The resultant water is led off from the fuel cell. The overall reaction is:

$$O_2 + 4H^+ + 4e^- \rightarrow 2H_2O$$

There is a potential between the anode and cathode of the fuel cell. To increase the potential, it is possible to arrange multiple fuel cells in mechanical succession to give a fuel cell stack and connect them electrically in series.

For homogeneous distribution of the fuel to the anode and for homogeneous distribution of the oxidant to the cathode, distributor plates are provided, which are also referred to as bipolar plates. The bipolar plates have, for example, conduit-like structures for distribution of the fuel and the oxidant. The bipolar plates may also have structures for passage of a cooling liquid through the fuel cell to lead off heat.

DE 10 2013 226 815 A1 discloses a fuel cell having a membrane electrode unit disposed between two bipolar plates. These bipolar plates each have distribution structures for distribution of the reaction gases to the electrodes.

The membrane of the membrane electrode unit has to be kept moist for the fuel cell to work properly. More particularly, in the case of operation of the fuel cell at comparatively high temperature, the membrane can dry out owing to the elevated water absorption capacity of the air, which can impair the function of the fuel cell.

SUMMARY OF THE INVENTION

A fuel cell is proposed, comprising at least one membrane electrode unit having a first electrode and a second electrode that are separated from one another by a membrane, and at least two bipolar plates that adjoin the membrane electrode unit on either side. These bipolar plates are interrupted by a first feed conduit for supply of a fuel and by a second feed conduit for supply of an oxidant. A first distribution structure for distribution of the fuel that faces the first electrode adjoins a first edge of the first feed conduit, and a second distribution structure for distribution of the oxidant that faces the second electrode adjoins a second edge of the second feed conduit.

The first electrode is also referred to as anode, and the second electrode is also referred to as cathode. The fuel is hydrogen, for example, and the oxidant is oxygen, for example, especially oxygen present in ambient air.

According to the invention, the first electrode extends along the membrane in a region spaced apart from the first edge of the first feed conduit, and the second electrode extends along the membrane in a region spaced apart from the second edge of the second feed conduit.

The centrally arranged membrane thus projects beyond the electrodes applied on either side. The membrane thus has regions on both sides that are located adjacent to the first feed conduit and the second feed conduit, and these regions directly adjoin the first distribution structure or the second distribution structure and are free of the electrodes.

Fuel which is guided to the first electrode via the first feed conduit and the first distribution structure thus flows through regions of the membrane and can thus transport moisture in the form of water vapor directly to the membrane. Oxidant which is guided to the second electrode via the second feed conduit and the second distribution structure thus also flows through regions of the membrane and can thus transport moisture in the form of water vapor directly to the membrane.

The membrane is preferably also permeable to water vapor. This allows moisture in the form of water vapor to be transported from the first distribution structure through the membrane to the second distribution structure, and also from the second distribution structure through the membrane to the first distribution structure.

In an advantageous configuration of the invention, the bipolar plates are interrupted by a first drain conduit for draining of the fuel, where the first distribution structure adjoins a first edge of the first drain conduit. The first drain conduit serves to drain unconsumed fuel from the first distribution structure. The first electrode here extends along the membrane in a region which is also spaced apart from the first edge of the first drain conduit. The membrane thus also has a region located adjacent to the first drain conduit that directly adjoins the first distribution structure and is free of the first electrode.

The first distribution structure preferably has a first inflow region that adjoins the first edge of the first feed conduit and a first outflow region that adjoins the first edge of the first drain conduit. A first main distribution region having a rectangular cross section is disposed here between the first inflow region and the first outflow region.

The first electrode preferably extends along the membrane in a region spaced apart from the first inflow region and from the first outflow region. The first electrode thus adjoins solely the first main distribution region of the first distribution structure.

In an advantageous configuration of the invention, the bipolar plates are interrupted by a second drain conduit for draining of the oxidant, where the second distribution structure adjoins a second edge of the second drain conduit. The second drain conduit serves to drain unconsumed oxidant from the second distribution structure. The second electrode here extends along the membrane in a region which is also spaced apart from the second edge of the second drain conduit. The membrane thus also has a region located adjacent to the second drain conduit that directly adjoins the second distribution structure and is free of the second electrode.

The second distribution structure preferably has a second inflow region adjoining the second edge of the second feed conduit and a second outflow region adjoining the second edge of the second drain conduit. A second main distribution region having a rectangular cross section is disposed here between the second inflow region and the second outflow region.

The second electrode preferably extends along the membrane in a region spaced apart from the second inflow region and from the second outflow region. The second electrode thus directly adjoins solely the second main distribution region of the second distribution structure.

The electrodes are preferably in a congruent arrangement with the membrane. The first electrode and the second electrode thus have an identical cross section and are mounted in opposite regions of the membrane. The membrane electrode unit thus has a mirror-symmetric configuration.

A fuel cell of the invention advantageously finds use in an electrical vehicle (EV).

The inventive configuration of the fuel cell creates regions on the membrane that directly adjoin the distribution structures and are free of electrodes. In this way, the membrane of the membrane electrode unit can constantly be sufficiently moistened. Even in the course of operation of the fuel cell at comparatively high temperature, drying-out of the membrane can be avoided. It is possible here for an external moistener for moistening of the membrane to be designed in a smaller size, or for no moistening of the membrane by an external moistener to be required, which saves space and costs.

Air flowing into the second distribution structure is already heated before it reaches the cathode. As a result, even upstream of the cathode, as a result of a vapor pressure gradient, water is transferred from the first distribution structure through the membrane into the second distribution structure. This operation takes place in the first distribution structure behind the anode. In the first distribution structure, therefore, there remains more distance and time to release water through the membrane into the second distribution structure. The air enriched with water of reaction behind the cathode has additional distance and time to transfer water through the membrane into the first distribution structure. In the first distribution structure, the inflowing hydrogen is already heated upstream of the anode, and has additional distance and time to absorb water from the second distribution structure.

BRIEF DESCRIPTION OF THE DRAWINGS

Embodiments of the invention are elucidated in detail with reference to the drawings and description which follows.

The figures show.

DETAILED DESCRIPTION

Figure 1:
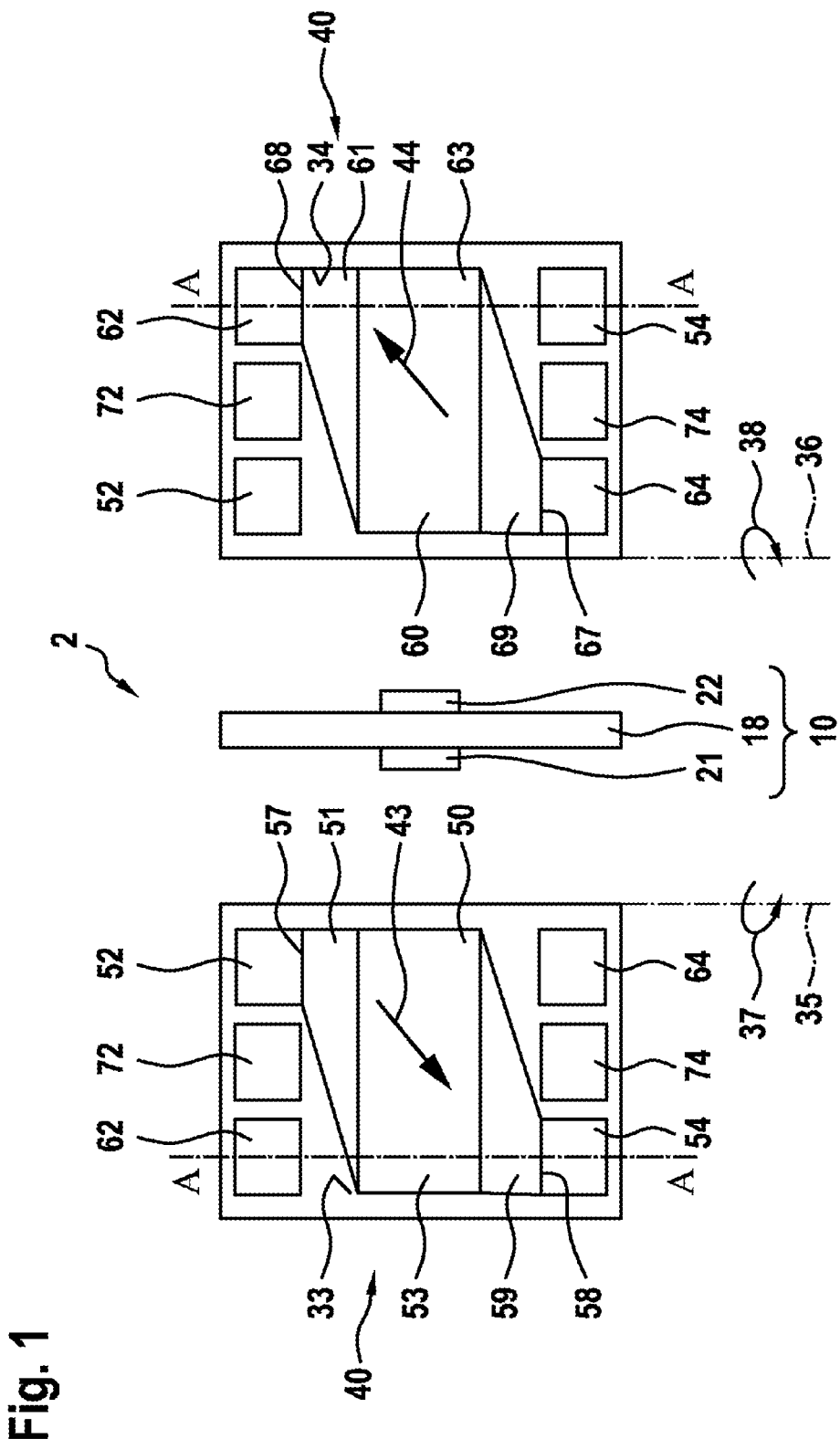
FIG. 1 an exploded diagram of a fuel cell.

In the description of the embodiments of the invention which follows, identical or similar elements are identified by the same reference numerals, dispensing with repeated description of these elements in individual cases. The figures represent the subject matter of the invention merely in schematic form.

FIG. 1 shows an exploded diagram of an inventive fuel cell 2. The fuel cell 2 has a membrane electrode unit 10 comprising a first electrode 21, a second electrode 22 and a membrane 18. The two electrodes 21, 22 are arranged on mutually opposite sides of the membrane 18 and are thus separated from one another by the membrane 18. The first electrode 21 is also referred to hereinafter as anode 21, and the second electrode 22 is also referred to hereinafter as cathode 22.

The electrodes 21, 22 in the present context are in a congruent arrangement with the membrane 18. The anode 21 and the cathode 22 have an identical cross section and are mounted on opposite regions of the membrane 18. The membrane electrode unit 10 thus has a mirror-symmetric configuration. The centrally arranged membrane 18 projects beyond the electrodes 21, 22 applied to either side.

The membrane 18 in the present context takes the form of a polymer electrolyte membrane. The membrane 18 is permeable to hydrogen ions, i.e. W ions. The membrane 18 is also permeable to water vapor. Especially water of reaction that forms in the reaction at the cathode 22 that takes place in the fuel cell 2 can thus diffuse into the membrane 18 and through the membrane 18 to the anode 21.

The fuel cell 2 also has two bipolar plates 40 that adjoin the membrane electrode unit 10 on either side. The bipolar plates 40 are each shown here in a top view. A bipolar plate 40 constitutes a first surface 33 here, which, in the assembled state of the fuel cell 2, faces the anode 21. The other bipolar plate 40 constitutes a second surface 34, which, in the assembled state of the fuel cell 2, faces the cathode 22.

In the assembly of the fuel cell 2, one bipolar plate 40, the first surface 33 of which is shown, must thus be rotated by 90° about a first axis 35 in a first direction of rotation 37. The other bipolar plate 40, the second surface 34 of which is shown, in the assembly of the fuel cell 2, must be rotated by 90° about a second axis 36 in a second direction of rotation 38

The two bipolar plates 40 are interrupted by a first feed conduit 52 for supply of a fuel and by a second feed conduit 64 for supply of an oxidant. In addition, the two bipolar plates 40 are interrupted by a first drain conduit 54 for draining of unconsumed fuel and by a second drain conduit 62 for draining of unconsumed oxidant and water. The two bipolar plates 40 are also interrupted by a third feed conduit 74 for supply of a coolant and by a third drain conduit 72 for draining of the coolant. The coolant serves to cool the fuel cell 2 in operation.

The first feed conduit 52, the second drain conduit 62 and the third drain conduit 72 are introduced here at a top end of the bipolar plates 40. The second feed conduit 64, the first drain conduit 54 and the third feed conduit 74 are introduced at an opposite bottom end. In the operation of the fuel cell 2, the fuel thus flows from the top end into the bottom end, and the oxidant and the coolant flow in the opposite direction from the bottom end into the top end.

The bipolar plates 40 each comprise a first distribution structure 50 for distribution of the fuel which is disposed on the first surface 33 and faces the anode 21. The first distribution structure 50 extends from a first edge 57 of the first feed conduit 52 as far as a first edge 58 of the first drain conduit 54. In operation of the fuel cell 2, the fuel flows from the first feed conduit 52 to the first drain conduit 54 in a first flow direction 43.

The first distribution structure 50 has a first inflow region 51 that adjoins the first edge 57 of the first feed conduit 52, and a first outflow region 59 that adjoins the first edge 58 of the first drain conduit 54. A first main distribution region 53 having a rectangular cross section is disposed between the first inflow region 51 and the first outflow region 59.

The bipolar plates 40 each comprise a second distribution structure 60 for distribution of the oxidant which is disposed on the second surface 34 and faces the cathode 22. The second distribution structure 60 extends from a second edge 67 of the second feed conduit 64 as far as a second edge 68 of the second drain conduit 62. In operation of the fuel cell 2, the oxidant flows from the second feed conduit 64 to the second drain conduit 62 in a second flow direction 44.

The second distribution structure 60 has a second inflow region 69 that adjoins the second edge 67 of the second feed conduit 64, and a second outflow region 61 that adjoins the second edge 68 of the second drain conduit 62. A second main distribution region 63 having a rectangular cross section is disposed between the second inflow region 69 and the second outflow region 61.

Figure 2:
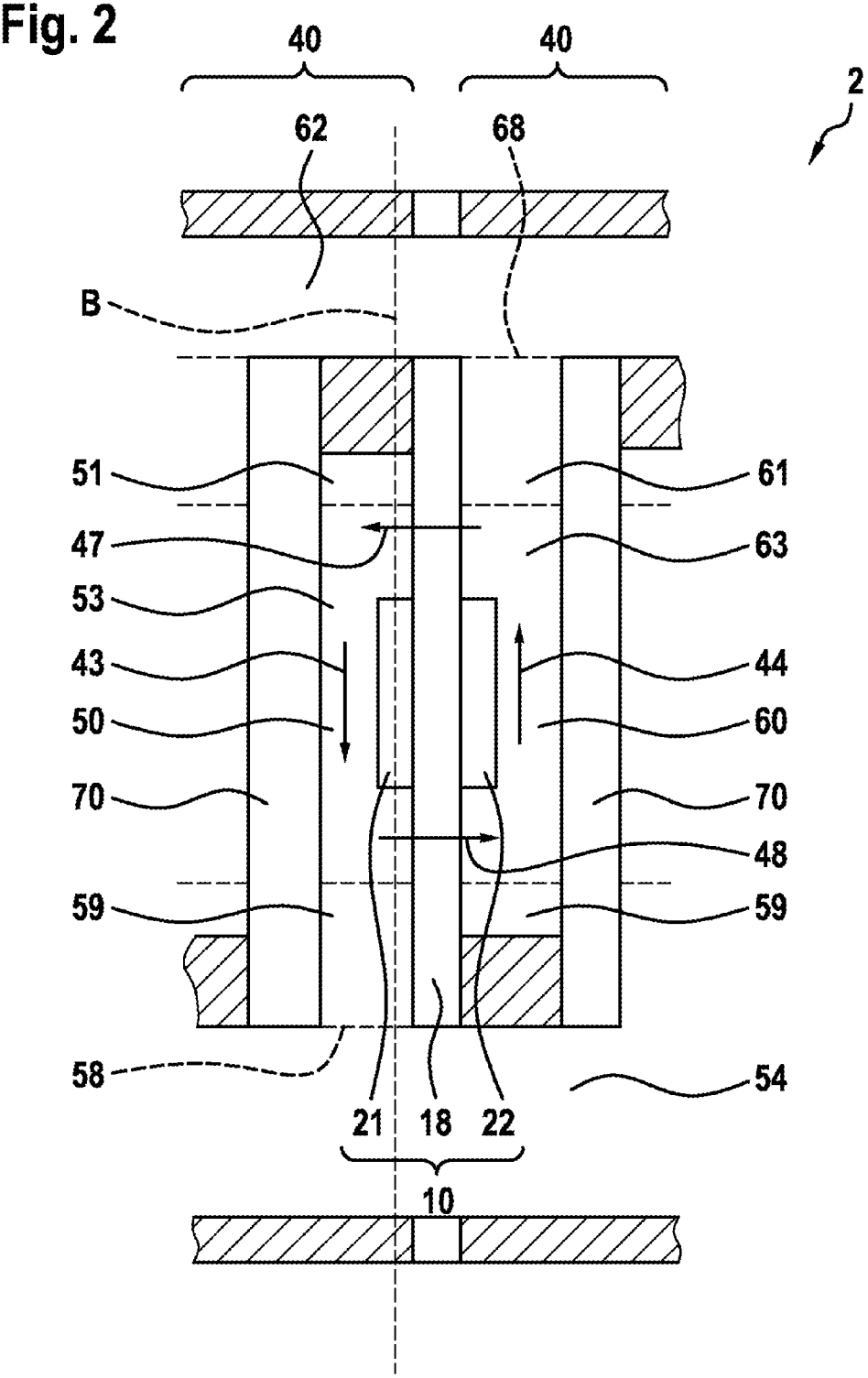
FIG. 2 a section through the assembled fuel cell along the section lines A-A from FIG. 1 and FIG. 3 a section through the assembled fuel cell along the section lines B-B from FIG. 2.

FIG. 2 shows a section through the assembled fuel cell 2 along the section lines A-A from FIG. 1. The fuel cell 2 here is part of a fuel cell stack constructed from bipolar plates 40 and membrane electrode units 10 in a mutually alternating arrangement. The bipolar plates 40 and the membrane electrode unit 10 are in such an arrangement that the anode 21 of the first distribution structure 50 faces one bipolar plate 40, and that the cathode 22 of the second distribution structure 60 faces the other bipolar plate 40.

The bipolar plates 40 comprise a third distribution structure 70 which extends from the third feed conduit 74, which is invisible here, to the third drain conduit 72, which is likewise invisible here. The third distribution structure 70 here is arranged between the first distribution structure 50 and the second distribution structure 60 and serves to pass the coolant through the bipolar plate 40 and through the fuel cell 2.

The anode 21 extends along the membrane 18 in a region spaced apart from the first edge 57 of the first feed conduit 52, which is invisible here, and from the first edge 58 of the first drain conduit 54. More particularly, the anode 21 extends along the membrane 18 in a region spaced apart from the first inflow region 51 and from the first outflow region 59. The anode 21 thus adjoins and extends into solely the first main distribution region 53 of the first distribution structure 50.

The membrane 18 thus has, on the side of the anode 21, a region which is located adjacent to the first feed conduit 52 and is free of the anode 21. The membrane 18 thus also has a region which is located adjacent to the first drain conduit 54 and is free of the anode 21. These two regions that are free of the anode 21 directly adjoin the first distribution structure 50.

The cathode 22 extends along the membrane 18 in a region spaced apart from the second edge 67 of the second feed conduit 64, which is invisible here, and from the second edge 68 of the second drain conduit 62. More particularly, the cathode 22 extends along the membrane 18 in a region spaced apart from the second inflow region 69 and from the second outflow region 61. The cathode 22 thus adjoins and extends into solely the second main distribution region 63 of the second distribution structure 60.

The membrane 18 thus has, on the side of the cathode 22, a region which is located adjacent to the second feed conduit 64 and is free of the cathode 22. The membrane 18 thus also has a region which is located adjacent to the second drain conduit 62 and is free of the cathode 22. These two regions that are free of the cathode 22 directly adjoin the second distribution structure 60.

In the operation of the fuel cell 2, fuel is guided through the first feed conduit 52 and the first distribution structure 50 to the anode 21 and further to the first drain conduit 54. The fuel flows here in the first flow direction 43 also through the regions of the membrane 18 that are free of the anode 21.

In the operation of the fuel cell 2, oxidant is guided through the second feed conduit 64 and the second distribution structure 60 to the cathode 22 and further to the second drain conduit 62. The oxidant flows here in the second flow direction 44 also through the regions of the membrane 18 that are free of the cathode 22.

The fuel, hydrogen in the present context, is oxidized catalytically at the anode 21 with release of electrons to give protons. The protons pass through the membrane 18 to the cathode 22. The electrons released are led off from the fuel cell 2 and flow through an external circuit to the cathode 22. The oxidant, atmospheric oxygen in the present context, reacts by accepting the electrons from the external circuit and protons that have passed through the membrane 18 to the cathode 22 to give water.

The water that forms in the reaction at the cathode 22 that takes place in the fuel cell 2 can diffuse partly from the second distribution structure 60 in a first diffusion direction 47 into the membrane 18 and through the membrane 18 into the first distribution structure 50 and to the anode 21. The water that diffuses in the first diffusion direction 47 is absorbed here by the fuel that flows within the first distribution structure 50.

The water absorbed by the fuel can subsequently diffuse from the first distribution structure 50 in a second diffusion direction 48 into the membrane 18 and through the membrane 18 into the second distribution structure 60 and to the cathode 22. The water that diffuses in the second diffusion direction 48 is absorbed here by the oxidant that flows within the second distribution structure 60.

The regions of the membrane 18 that are free of electrodes 21, 22 and adjoin the distribution structures 50, 60 thus enable constant diffusion of water into the membrane 18 and through the membrane 18. This constantly moistens the membrane 18. Excess water is led off from the fuel cell 2, especially from the second distribution structure 60 via the second drain conduit 62.

Figure 3:
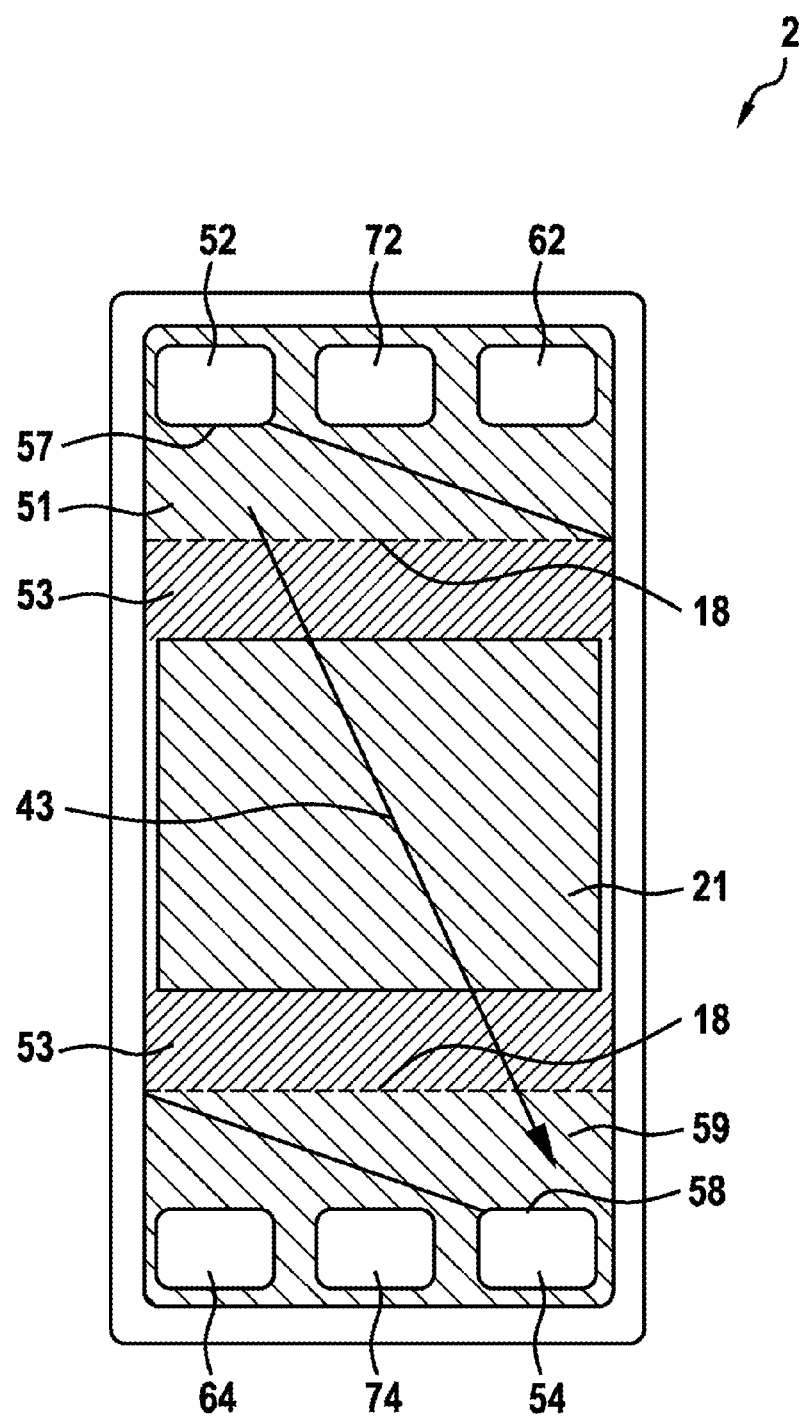

FIG. 3 shows a section through the assembled fuel cell 2 along the section line B-B from FIG. 2. The membrane 18 here has a centrally located region on which the anode 21 is disposed. The membrane 18 also has a region that extends over part of the first main distribution region 53 and over the first inflow region 51, and which is free of the anode 21. The membrane 18 also has a region which extends over part of the first main distribution region 53 and over the first outflow region 59, and which is free of the anode 21.

The invention is not limited to the working examples described here and the aspects emphasized therein. Instead, a multitude of modifications that are within the routine activity of the person skilled in the art is possible within the scope specified by the claims.

The invention claimed is:
1. A fuel cell (2) comprising
   at least one membrane electrode unit (10) having a first electrode (21) and a second electrode (22), separated from one another by a membrane (18), and
   at least two bipolar plates (40) that adjoin the membrane electrode unit (10) on either side, wherein the bipolar plates (40) are interrupted by a first feed conduit (52) for supply of a fuel and by a second feed conduit (64) for supply of an oxidant, wherein a first distribution structure (50) facing the first electrode (21) adjoins a first edge (57) of the first feed conduit (52), wherein a second distribution structure (60) facing the second electrode (22) adjoins a second edge (67) of the second feed conduit (64), wherein the first electrode (21) extends along the membrane (18) in a region spaced apart from the first edge (57) of the first feed conduit (52), wherein the second electrode (22) extends along the membrane (18) in a region spaced apart from the second edge (67) of the second feed conduit (64), and wherein the membrane (18) has, on a side facing the first electrode (21), a region which is located adjacent to the first feed conduit (52), which is free of the first electrode (21) and which directly adjoins the first distribution structure (50), and wherein the membrane (18) has, on a side facing the second electrode (22), a region which is located adjacent to the second feed conduit (64), which is free of the second electrode (22), and which directly adjoins the second distribution structure (60).

2. The fuel cell (2) as claimed in claim 1, characterized in that the membrane (18) is permeable to water vapor.

3. The fuel cell (2) as claimed in claim 1, characterized in that
the bipolar plates (40) are interrupted by a first drain conduit (54) for draining of the fuel, wherein
the first distribution structure (50) adjoins a first edge (58) of the first drain conduit (54), and
the first electrode (21) extends along the membrane (18) in a region spaced apart from the first edge (58) of the first drain conduit (54).

4. The fuel cell (2) as claimed in claim 3, characterized in that
the first distribution structure (50) has
a first inflow region (51) that adjoins the first edge (57) of the first feed conduit (52) and
a first outflow region (59) that adjoins the first edge (58) of the first drain conduit (54), wherein
a first main distribution region (53) having a rectangular cross section is disposed between the first inflow region (51) and the first outflow region (59).

5. The fuel cell (2) as claimed in claim 4, characterized in that
the first electrode (21) extends along the membrane (18) in a region spaced apart from the first inflow region (51) and from the first outflow region (59).

6. The fuel cell (2) as claimed in claim 1, characterized in that
the bipolar plates (40) are interrupted by a second drain conduit (62) for draining of the oxidant, wherein
the second distribution structure (60) adjoins a second edge (68) of the second drain conduit (62), and
the second electrode (22) extends along the membrane (18) in a region spaced apart from the second edge (68) of the second drain conduit (62).

7. The fuel cell (2) as claimed in claim 6, characterized in that
the second distribution structure (60) has
a second inflow region (69) that adjoins the second edge (67) of the second feed conduit (64) and
a second outflow region (61) that adjoins the second edge (68) of the second drain conduit (62), wherein
a second main distribution region (63) having a rectangular cross section is disposed between the second inflow region (59) and the second outflow region (61).

8. The fuel cell (2) as claimed in claim 7, characterized in that
the second electrode (22) extends along the membrane (18) in a region spaced apart from the second inflow region (69) and from the second outflow region (61).

9. The fuel cell (2) as claimed in claim 1, characterized in that
the electrodes (21, 22) are in a congruent arrangement with the membrane (18).

10. An electrical vehicle (EV) comprising a fuel cell (2) as claimed in claim 1.

* * * * *